United States Patent
Jeong et al.

(10) Patent No.: US 11,277,085 B2
(45) Date of Patent: Mar. 15, 2022

(54) APPARATUS AND METHOD FOR CONTROLLING MOTOR

(71) Applicant: HYUNDAI MOBIS CO., LTD., Seoul (KR)

(72) Inventors: Hyeon Hee Jeong, Yongin-si (KR); Kyu Ha Kim, Yongin-si (KR); In Hyuk Kim, Yongin-si (KR); Jeong Hoon Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 13 days.

(21) Appl. No.: 16/680,960

(22) Filed: Nov. 12, 2019

(65) Prior Publication Data

US 2020/0162001 A1    May 21, 2020

(30) Foreign Application Priority Data

Nov. 16, 2018   (KR) .......................... 10-2018-0141613

(51) Int. Cl.
*H02P 21/22* (2016.01)
*H02P 21/05* (2006.01)
(Continued)

(52) U.S. Cl.
CPC ............. *H02P 21/05* (2013.01); *B62D 5/0463* (2013.01); *H02P 21/22* (2016.02); *H02P 27/12* (2013.01); *H02P 2201/03* (2013.01)

(58) Field of Classification Search
CPC ....... B62D 5/0463; H02P 21/22; H02P 21/05; H02P 27/08; H02P 6/28; H02P 27/12
See application file for complete search history.

(56) References Cited

U.S. PATENT DOCUMENTS

| 7,893,650 B2* | 2/2011 | Arnet ...................... H02P 21/22 |
| | | 318/811 |
| 9,024,552 B2* | 5/2015 | Tazawa ............... H02P 23/0031 |
| | | 318/400.01 |

(Continued)

FOREIGN PATENT DOCUMENTS

| JP | 2011-114873 A | 6/2011 |
| KR | 10-2014-0086063 A | 7/2014 |
| WO | 2018/131086 A1 | 7/2018 |

OTHER PUBLICATIONS

Office Action of corresponding Korean Patent Application No. 10-2018-0141613—5 pages (dated May 14, 2020).

*Primary Examiner* — Thai T Dinh
(74) *Attorney, Agent, or Firm* — NSIP Law

(57) ABSTRACT

An apparatus for controlling a motor may include: an inverter unit configured to output 3-phase AC currents through a plurality of switches to be switched by an input control signal to drive a 3-phase motor; a current detection unit including a plurality of current sensors configured to detect two or more phase currents among the 3-phase AC currents flowing through the 3-phase motor; and a control unit configured to receive respective fed-back phase currents detected by the plurality of respective current sensors, correct the phase currents by applying, to the fed-back phase currents, respective correction gains estimated in advance on the plurality of respective current sensors so as to compensate for a current detection deviation of each of the plurality of respective current sensors, and then control the inverter unit based on the corrected phase currents to control driving of the 3-phase motor.

12 Claims, 13 Drawing Sheets

(51) Int. Cl.
  *H02P 27/12*   (2006.01)
  *B62D 5/04*   (2006.01)

(56)     References Cited

U.S. PATENT DOCUMENTS

| | | | | |
|---|---|---|---|---|
| 2003/0214266 | A1* | 11/2003 | Cheng | H02P 6/06 |
| | | | | 318/716 |
| 2004/0155620 | A1* | 8/2004 | Myers | H02M 7/53875 |
| | | | | 318/632 |
| 2009/0189553 | A1* | 7/2009 | Arnet | H02P 21/22 |
| | | | | 318/400.3 |
| 2013/0147453 | A1* | 6/2013 | Hirotsu | H02P 3/22 |
| | | | | 323/282 |
| 2013/0249447 | A1* | 9/2013 | Ishii | H02P 23/0004 |
| | | | | 318/400.01 |
| 2014/0091742 | A1* | 4/2014 | Suzuki | H02P 29/027 |
| | | | | 318/400.22 |
| 2014/0145696 | A1* | 5/2014 | Hoshino | H02M 3/157 |
| | | | | 323/283 |
| 2016/0131142 | A1* | 5/2016 | Nakajima | F04D 15/0094 |
| | | | | 417/42 |

* cited by examiner

APPARATUS AND METHOD FOR CONTROLLING MOTOR

CROSS-REFERENCES TO RELATED APPLICATIONS

The present application claims priority to Korean application number 10-2018-0141613, filed on Nov. 16, 2018, which is incorporated by reference in its entirety.

BACKGROUND OF THE INVENTION

The present invention relates to an apparatus and method for controlling a motor, and more particularly, to an apparatus and method for controlling the operation of a motor by removing a deviation between current sensors applied to a motor driving system.

A motor driving power steering (MDPS) system of a vehicle is a device configured to enable easy steering by providing a part of a steering torque, which should be applied to a handle by a driver at the time of steering the vehicle, using an auxiliary power source. The MDPS system determines a traveling condition of the vehicle through a column torque sensor configured to measure a column torque of a driver input to a steering wheel, a steering angle sensor configured to measure a steering angle or a steering angle velocity of a steering wheel, a vehicle speed sensor configured to measure a vehicle speed, or the like, and provides an auxiliary torque through an electric motor (MDPS motor) based on the column torque applied to a steering axis, as the driver steers the steering wheel.

Typically, the MDPS motor is realized with a 3-phase AC motor, and an MDPS electronic control unit (ECU) controls driving of the MDPS motor by receiving each fed-back phase current output to the MDPS motor and by controlling an inverter through a proportional integral (PI) control to cause a 3 phase AC current to be output. Here, the each phase current output to the MDPS motor is detected by a plurality of current sensors applied to the MDPS system to be fed back to the MDPS ECU.

Each current sensor applied for a feedback control of the MDPS system operates to output a voltage corresponding to the detected current. As shown in FIG. 1A, the sensitivity of the current sensor, which can be defined as a ratio of the output voltage over the detected current, is designed identically for each current sensor. However, when the current sensors are mounted in the vehicle to control the MDPS motor, it is not avoidable that a current detection deviation is present for each current sensor (in other words, the sensitivity is different for each current sensor), and thus, as shown in FIG. 1B, a phase current unbalance occurs in which different voltages are output from the current sensors, even when an identical current is detected. In other words, as shown in FIG. 1B, a current sensor A and a current sensor B are designed to have the sensitivity of $\alpha$, but in a process in which the current sensors are mounted in the vehicle and used for an MDPS motor control, the sensitivities of the current sensors respectively appear as $\beta$ and $\gamma$. Accordingly, the phase current unbalance occurs in which the current sensor A and the current sensor B output different voltages, despite of detecting an identical current.

FIG. 2A illustrates an unbalance state between 3-phase currents flowing through the MDPS motor. When the unbalance occurs between the phase currents, a torque ripple (a second torque ripple based on an electrical angle, a 6th or 8th torque ripple based on a mechanical angle) of the MDPS ripple is generated as shown in FIG. 2B. The generated torque ripple increases, as the current detection deviation between the current sensors becomes larger. Furthermore, the torque ripple causes foreignness when the driver steers, and even also causes an operation noise of the MDPS system to increase.

The related art of the present invention is disclosed in Korea Patent Application Publication No. 10-2014-0086063 (Jul. 8, 2014).

SUMMARY OF THE INVENTION

Embodiments of the present invention are directed to an apparatus and method for controlling a motor capable of improving noise, vibration and harshness (NVH) performance of a motor driving power steering (MDPS) system by removing an unbalance of 3-phase currents flowing through an MDPS motor to remove steering foreignness of a driver and an operation noise of the MDPS system.

In one embodiment, an apparatus for controlling a motor may include: an inverter unit configured to output 3-phase AC currents through a plurality of switches to be switched by an input control signal to drive a 3-phase motor; a current detection unit including a plurality of current sensors configured to detect two or more phase currents among the 3-phase AC currents flowing through the 3-phase motor; and a control unit configured to control driving of the 3-phase motor by receiving respective fed-back phase currents detected by the plurality of respective current sensors, correcting the phase currents by applying, to the fed-back phase currents, respective correction gains estimated in advance on the plurality of respective current sensors so as to compensate for a current detection deviation of each of the plurality of respective current sensors, and then controlling the inverter unit based on the corrected phase currents.

The control unit may estimate the respective correction gains on the plurality of respective current sensors so that the deviation between respective currents detected by the plurality of respective current sensors is removed, in a state where a DC current is output to the 3-phase motor from the inverter unit and the DC current flows identically to the plurality of current sensors.

The control unit may apply, as a test control signal, an identical PWM control signal to first to Kth (where K is a natural number equal to or smaller than N) switches among first to Nth (where N is a natural number) switches provided in the inverter unit and causes the DC current to be output to the 3-phase motor.

After the DC current, which flows to the 3-phase motor MT from the inverter unit, reaches a steady state, the control unit may calculate each average of the currents respectively detected by the plurality of current sensors, and estimate the respective correction gains on the plurality of current sensors so that the calculated deviations of the respective average currents are removed.

At a time of driving the 3-phase motor, the inverter unit may include a first upper switch and a first lower switch serially connected at a first node to which a first phase AC current is output, a second upper switch and a second lower switch serially connected at a second node to which a second phase AC current is output, and a third upper switch and a third lower switch serially connected at a third node to which a third phase AC current is output.

The current detection unit may include a first current sensor connected between the first node and a first phase of the 3-phase motor, and a second current source connected between the second node and a second phase of the 3-phase motor.

The control unit may estimate first and second correction gains on the respective first and second current sensors so that the deviation between the currents respectively detected by the first and second current sensors is removed in a state where the identical DC current flows to the first and second current sensors by applying an identical PWM control signal to the first upper switch and the second lower switch, and by turning off the first lower switch, the second upper switch, the third upper switch and the third lower switch.

The current detection unit may include a first current sensor between the second lower switch and a reference node, and a second current sensor may be connected between the third lower switch and the reference node.

The control unit may estimate first and second correction gains for the respective first and second current sensors so that the deviation between the currents respectively detected by the first and second current sensors is removed in a state where the identical DC current flows to the first and second current sensors by applying an identical PWM control signal to the first upper switch, the second lower switch, and the third lower switch, and by turning off the first lower switch, the second upper switch, the third upper switch.

In another embodiment, a method for controlling a motor using a motor control apparatus, which includes an inverter unit configured to output 3-phase AC currents through a plurality of switches to be switched by an input control signal to drive a 3-phase motor, and a current detection unit including a plurality of current sensors configured to detect two or more phase currents among the 3-phase AC currents flowing through the 3-phase motor, the motor control method may include: estimating respective correction gains of the plurality of current sensors based on respective currents detected by the plurality of current sensors so as to compensate for a current detection deviation of each of the plurality of current sensors; receiving respective fed-back phase currents detected by the plurality of current sensors, and correcting the phase currents by applying the estimated correction gains to the respective fed-back phase currents; and controlling the inverter unit based on the corrected phase currents to control driving of the 3-phase motor.

DESCRIPTION OF SPECIFIC EMBODIMENTS

Figure 1A:
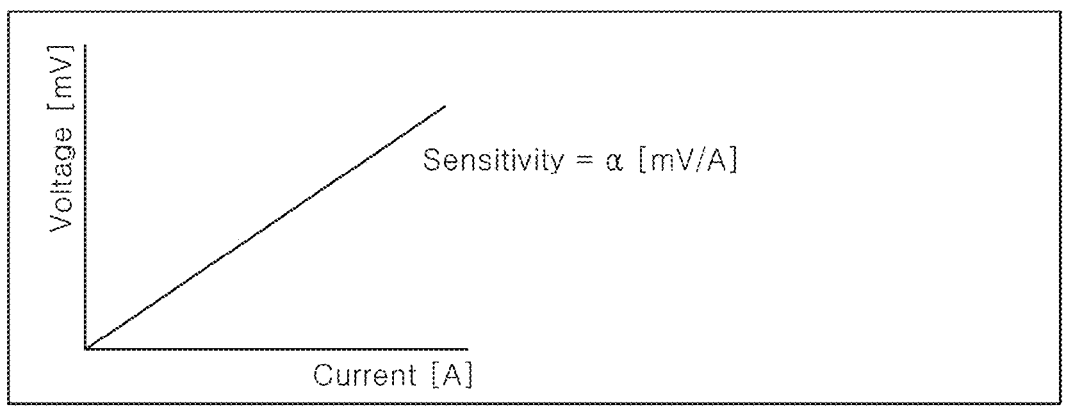
FIGS. 1A and 1B are graphs for showing a current detection deviation between current sensors, which is applied to a motor driving power steering (MDPS) system.
Figure 1B:
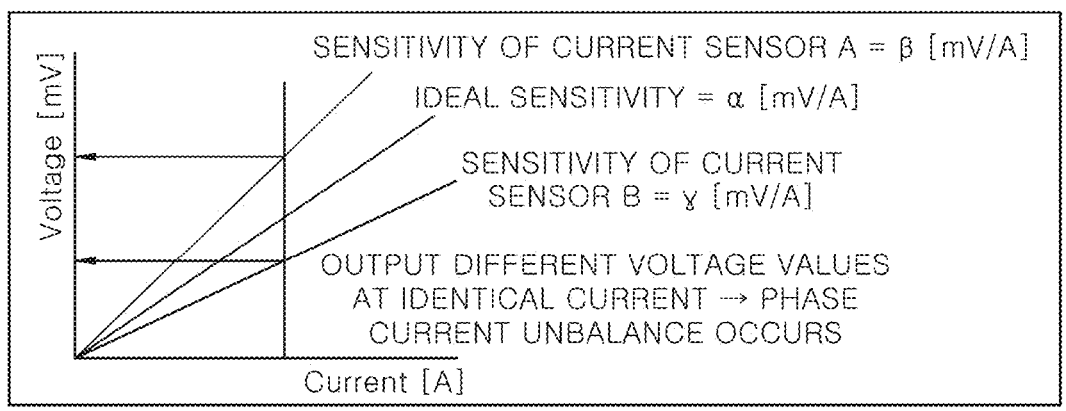
Figure 2A:
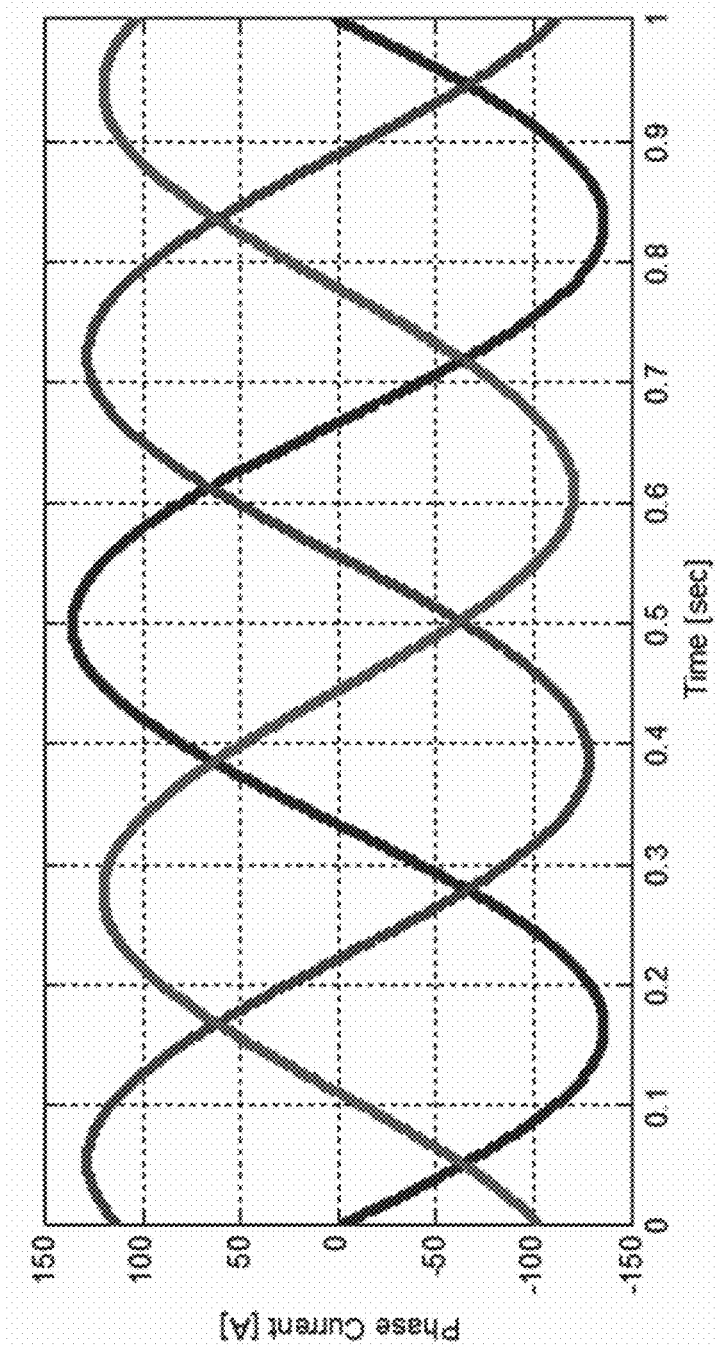
FIGS. 2A and 2B respectively illustrate a phase current unbalance state and a torque ripple generation phenomenon occurring according to a current detection deviation between current sensors, which is applied to the MDPS system.
Figure 2B:
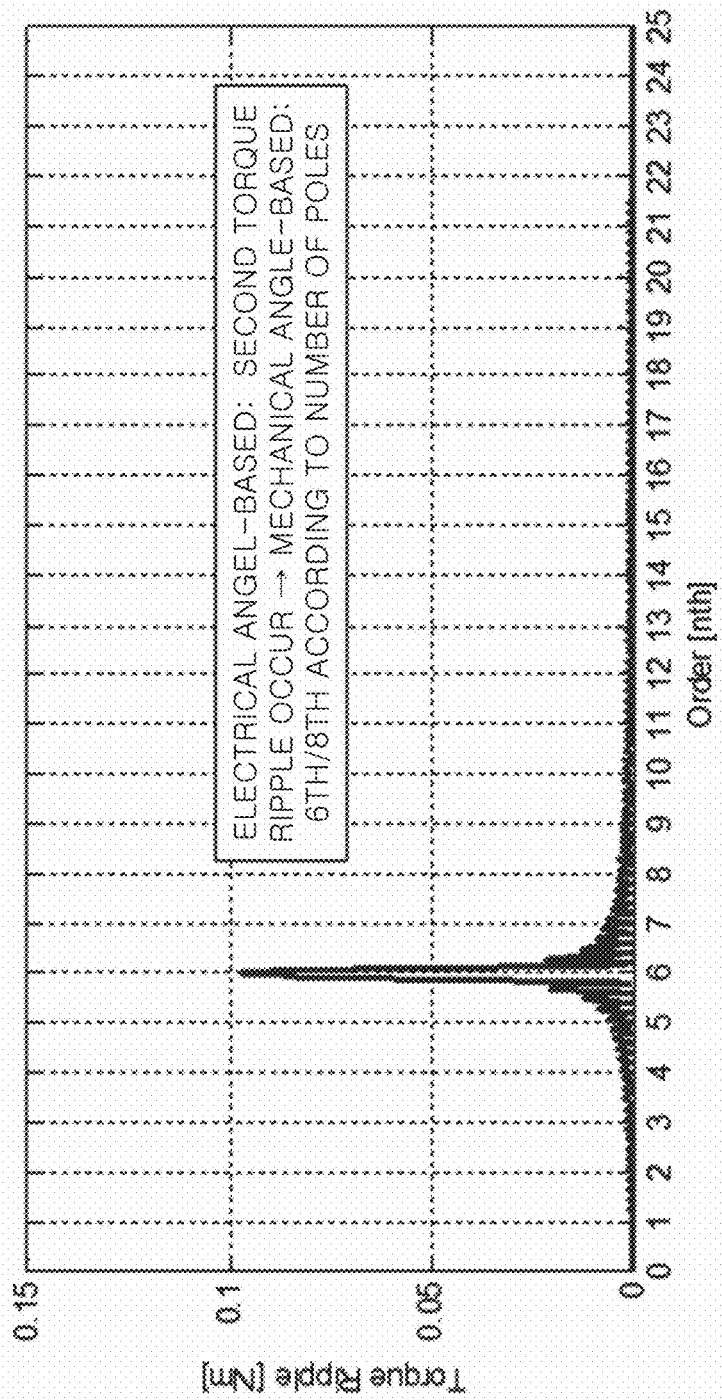

Hereinafter, embodiments of an apparatus and method for controlling a motor according to the present invention will be described in detail in conjunction with the accompanying drawings. Thicknesses of lines and sizes of elements in the drawings may be exaggerated for clarity and convenience of explanation. In addition, terms used throughout the present specification are defined in consideration of functions in the present invention, and thus may be different depending upon user's and operator's intentions, or practices.

Therefore the terms may be defined based on descriptions made throughout example embodiments.

Figure 3:
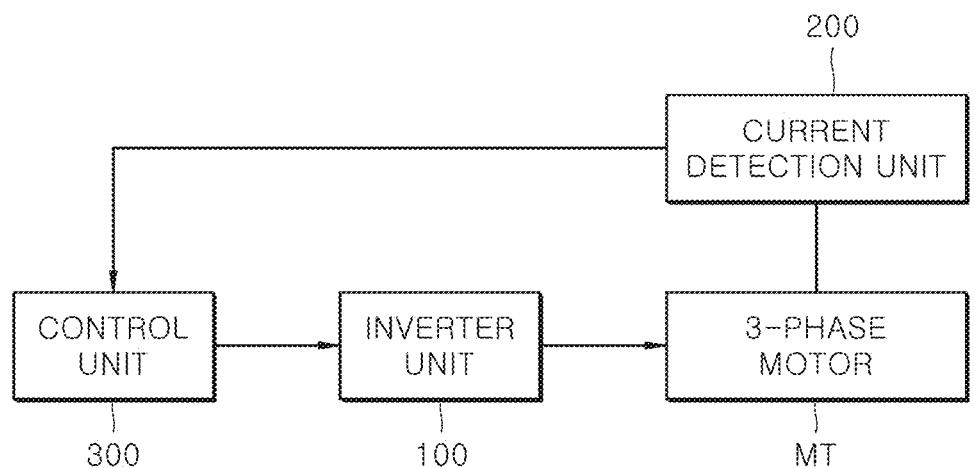
FIG. 3 is a block configuration diagram for describing an apparatus for controlling a motor in accordance with an embodiment of the present invention.
Figure 4:
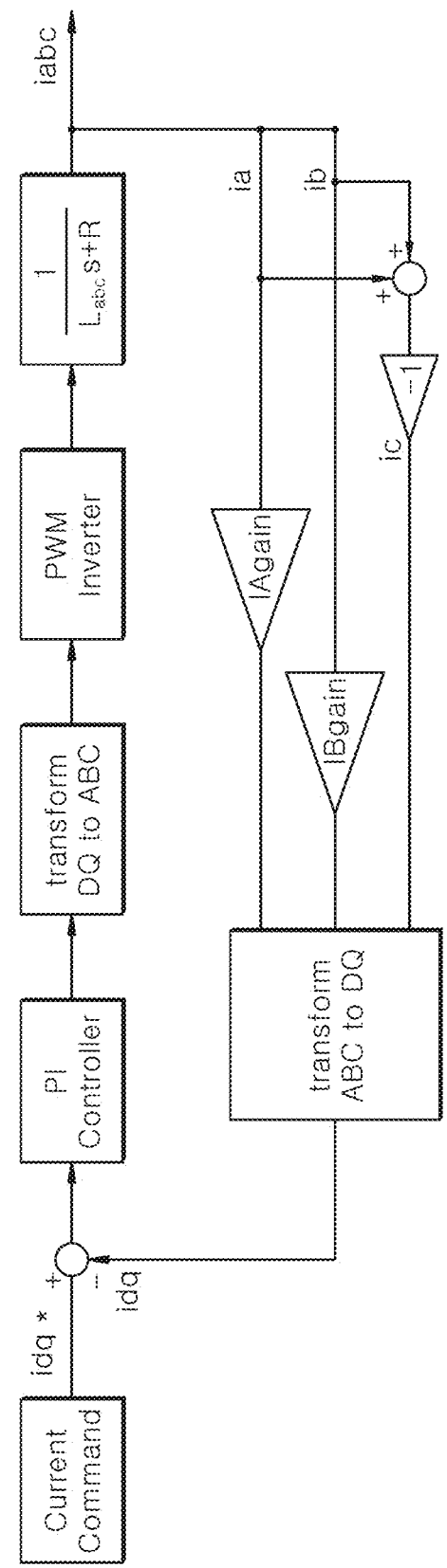
FIG. 4 is a block configuration diagram for describing an overall operation of the motor control apparatus in accordance with an embodiment of the present invention.
Figure 5:
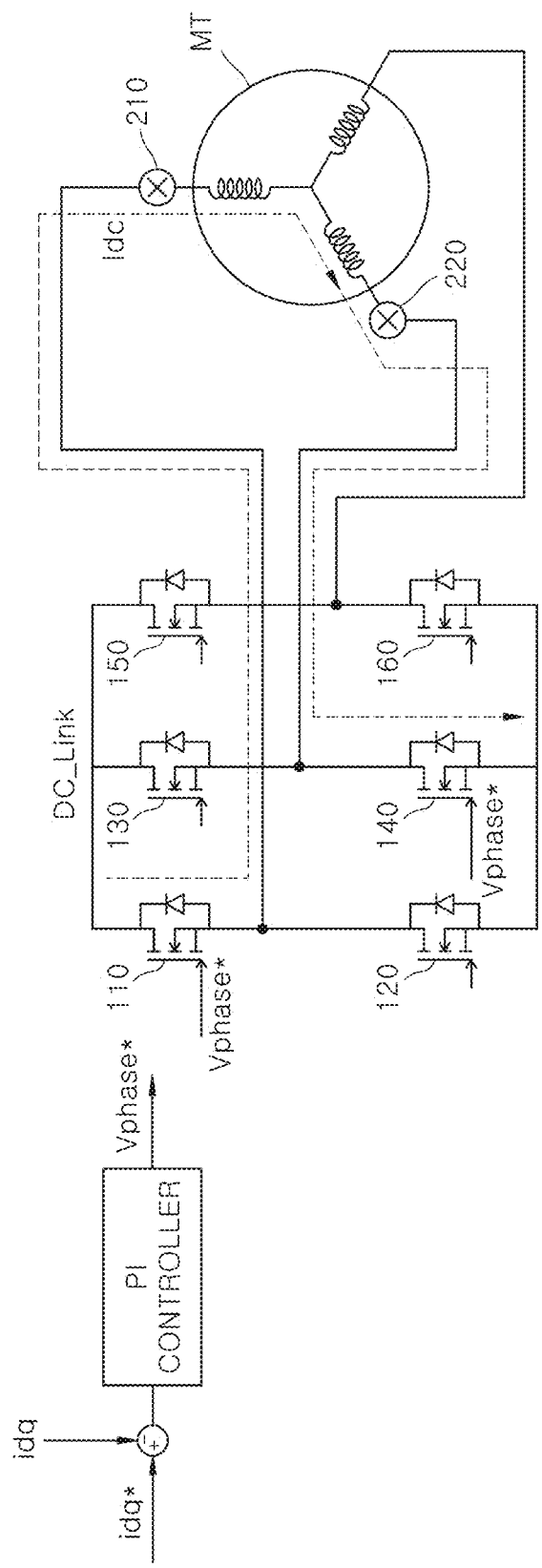
FIGS. 5 and 6 are circuit diagrams for describing a method for estimating a correction gain in the motor control apparatus in accordance with an embodiment of the present invention.
Figure 6:
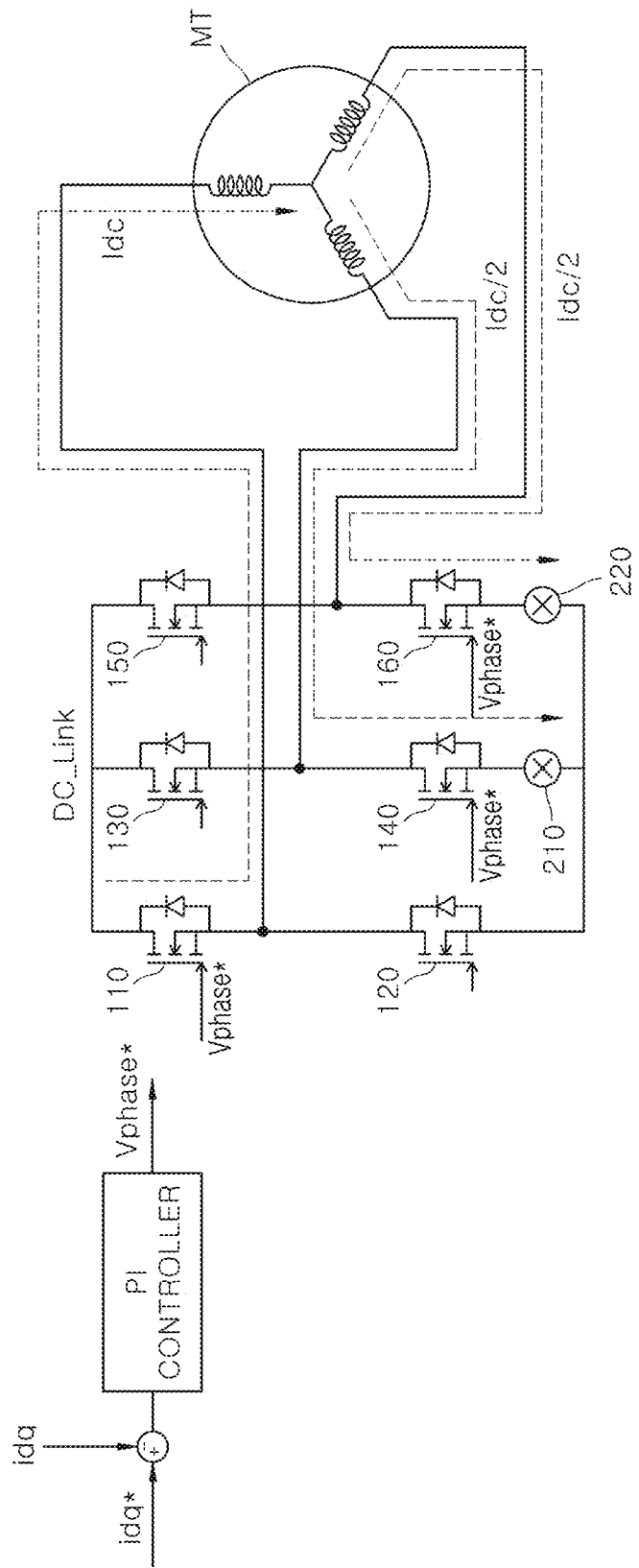

FIG. 3 is a block configuration diagram for describing an apparatus for controlling a motor in accordance with an embodiment of the present invention, FIG. 4 is a block configuration diagram for describing an overall operation of the motor control apparatus in accordance with an embodiment of the present invention, FIGS. 5 and 6 are circuit diagrams for describing a method for estimating a correction gain in the motor control apparatus in accordance with an embodiment of the present invention, FIG. 7 is a graph showing a result in which a current detection deviation between current sensors is removed in the motor control apparatus in accordance with an embodiment of the present invention, and FIG. 8 illustrates a state in which a phase current unbalance is removed in the motor control apparatus in accordance with an embodiment of the present invention.

With reference to FIG. 3, the motor control apparatus in accordance with an embodiment of the present invention may include an inverter unit 100, a current detection unit 200, and a control unit 300.

The inverter unit 100 is connected to a 3-phase motor MT, and drives the 3-phase motor MT based on a voltage (DC-Link voltage) supplied from a battery of a vehicle. In detail, the inverter unit 100 may drive the 3-phase motor MT by outputting a 3 phase AC current through a plurality of switches, each of which being switched by a control signal input from the control unit 300 to be described later. In the present embodiment, the 3-phase motor MT may be an MDPS motor configured of first to third phase inductors to provide an auxiliary torque, and accordingly, the inverter unit 100 may output the first to third phase AC currents to the first to third inductors respectively to drive the 3-phase motor MT.

As shown in FIGS. 5 and 6, at the time of driving the 3-phase motor MT, the inverter unit 100 may include a first upper switch 110 and a first lower switch 120 serially connected at a first node to which the first phase AC current is output, a second upper switch 130 and a second lower switch 140 serially connected at a second node to which the second phase AC current is output, and a third upper switch 150 and a third lower switch 160 serially connected at a third node to which the third phase AC current is output. Accordingly, each switch included in the inverter unit 100 may be turned on or off through a PWM control signal input from the control unit 300, and thus allow the first to third AC currents to be respectively output through the first to third nodes.

The current detection unit 200 may detect the AC currents flowing through the 3-phase motor MT at the time of typically driving the 3-phase motor MT, and to this end, may include a plurality of current sensors configured to detect two or more phases among the 3 phase AC currents flowing through the 3-phase motor MT. Hereinafter, the current detection unit 200 will be described to include first and second current sensors 210 and 220 configured to respectively detect 2 phase currents flowing through the 3-phase motor MT.

The current detection unit 200 of the present embodiment may be realized in a Hall IC type as shown in FIG. 5, or in a shunt type as shown in FIG. 6. When the current detection unit 200 is realized in the Hall IC type, the first current sensor 210 may be connected between the first node of the inverter unit 100 and the first phase of the 3-phase motor MT, and the second current sensor 220 may be connected between the second node of the inverter unit 100 and the second phase of the 3-phase motor MT. When the current detection unit 200 is realized in the shunt type, the first current sensor 210 may be connected between the second lower switch 140 and a reference node (e.g. a ground node), and the second current sensor 220 may be connected between the third lower switch 160 and the reference node. According to the type in which the current detection unit 200 is realized, a method for estimating the correction gain may change as will be described below.

The control unit 300 may receive each fed-back phase current detected by each current sensor, and control the inverter unit 100 in a PI control manner to control driving of the 3-phase motor MT. Here, as described above, since it is not avoidable that a current detection deviation is present for each current sensor, a phase current unbalance occurs in which different voltages are output from the respective current sensors even when an identical current is detected. Hence, a torque ripple of the 3-phase motor MT, steering foreignness of the driver, and an operation noise of the MDPS system are generated.

Accordingly, in the present embodiment, the control unit 300 may drive the 3-phase motor MT by receiving the each fed-back phase current detected by each current sensor, applying, to each phase current, each correction gain pre-estimated for each current sensor so as to compensate for the current detection deviation of each current sensor and correcting the each current phase, and then controlling the inverter unit 100 based on the each corrected phase current. More specifically, as shown in FIG. 4, the control unit 300 may control the driving of the 3-phase motor MT by receiving the each fed-back phase current ia or ib detected by each current sensor, applying the pre-estimated correction gain thereto, subtracting each corrected phase current (in detail, idq generated by ABC/DQ-converting the each corrected phase current) from an instruction current idq*, and then applying a PWM control signal to the inverter unit 100 through a PI control to cause the 3 phase AC currents to be output from the inverter unit 100.

In other words, since the current detection deviation is reflected to the each detected phase current, the deviation is required to be compensated. Therefore, the control unit 300 may improve feedback control performance on the 3-phase motor MT by applying each pre-estimated correction gain to each current sensor to correct each of the detected phase currents.

For the clear definition of terms, the current detection deviation of each current sensor is defined as a deviation between output values (i.e. output voltages) output from the respective current sensors, when an identical current is sensed. Since the current detection deviation is caused by the difference in sensitivity (i.e. ratio (output voltage/detection current) of the output voltage output according to the detection current)), it may be understood that compensation for the current detection deviation between the currents sensors is equivalent to matching of the sensitivities between the current sensors.

Hereinafter, detailed descriptions will be provided about a process of estimating the correction gain in order to compensate each current sensor included in the current detection unit 200 for the current detection deviation.

The control unit 300 may estimate the correction gains of the respective current sensors so that a deviation between currents respectively detected by the current sensors is removed in a state where when a test control signal is applied to the inverter unit 100, a DC current flows from the inverter unit 100 to the 3-phase motor MT and thus an identical DC current flows through each current sensor. When the test control signal is applied to the inverter unit 100, the control unit 300 may apply, as the test control signal, an identical PWM control signal to first to Kth switches (where K is a natural number equal to or smaller than N) among first to Nth switches (wherein N is a natural number) included in the inverter unit 100. According to the above-described switch configuration of the inverter unit 100, when N is 6 and the current detection unit 200 is realized in the Hall IC type and in the shunt type, K is 2 and 3 respectively. Specific embodiments thereabout will be provided with reference to FIGS. 5 and 6.

FIG. 5 is a circuit diagram for describing a method for estimating respective first and second correction gains on the first and second current sensors 210 and 220, when the current detection unit 200 is realized in the Hall IC type, in other words, when the current detection unit 200 includes the first current sensor 210 connected between the first node of the inverter unit 100 and the first phase of the 3-phase motor MT, and the second current sensor 220 connected between the second node of the inverter unit 100 and the second phase of the 3-phase motor MT.

The control unit 300 may estimate the first and second correction gains on the first and second current sensors 210 and 220, respectively, so that the deviation between the currents detected by the first and second current sensors 210 and 220 is removed in a state where an identical DC current flows to the first and second current sensors 210 and 220 by applying an identical PWM control signal to the first upper switch 110 and the second lower switch 140, and by turning off the first lower switch 130, the second upper switch 130, the third upper switch 150 and the third lower switch 160.

In detail, when the control unit 300 applies the identical PWM control signal (i.e. PWM control signal having the identical magnitude, an identical duty ratio and an identical phase) to the first upper switch 110 and the second lower switch 140, the DC current flows, based on a DC-Link voltage, along a current path connected to the first node, the first current sensor 210, the first phase inductor, the second phase inductor, the second current sensor 220 and the second lower switch 140. Accordingly, since a state is formed in which the identical DC current flows to the first and second current sensors 210 and 220, the magnitudes of the currents detected by the first and second current sensors 210 and 220 should be identical. Here, when the deviation is present between the currents detected by the first and second current sensors 210 and 220, the control unit 300 may estimate the first and second correction gains on the first and second current sensors 210 and 220 respectively so that the deviation is removed.

When the magnitude of the current detected by the first current sensor 210 is equal to or higher than that of the current detected by the second current sensor 220, the first and second correction gains may be estimated according to the following Equation (1).

$$IA_{gain} = 1 - \left\{ abs\left(\frac{IA_{sen}}{IB_{sen}}\right) - 1 \right\} \times \frac{1}{2}$$

$$IB_{gain} = 1 + \left\{ abs\left(\frac{IA_{sen}}{IB_{sen}}\right) - 1 \right\} \times \frac{1}{2}$$

When the magnitude of the current detected by the first current sensor 210 is smaller than that of the current detected by the second current sensor 220, the first and second correction gains may be estimated according to the following Equation (2).

$$IA_{gain} = 1 - \left\{ abs\left(\frac{IA_{sen}}{IB_{sen}}\right) - 1 \right\} \times \frac{1}{2}$$

$$IB_{gain} = 1 + \left\{ abs\left(\frac{IA_{sen}}{IB_{sen}}\right) - 1 \right\} \times \frac{1}{2}$$

In Equations (1) and (2), $IA_{gain}$ and $IB_{gain}$ respectively denote the first and second correction gains, and $IA_{sen}$ and $IB_{sen}$ respectively denote the currents detected by the first and second current sensors 210 and 220.

That the control unit 300 applies the identical PWM control signal to the first upper switch 110 and the second lower switch 140 is to prevent a current from being leaked to a phase that is not controlled and to prevent a rotor of the 3-phase motor MT from vibrating so as to precisely control formation of the DC current.

On the other hand, when the current detection unit 200 is realized in the Hall IC type, in consideration of the hysteresis characteristics of the first and second current sensors 210 and 220, a process in which the control unit 300 calculates offsets of the first and second current sensors 210 and 220 may be preceded before estimation of the first and second correction gains.

FIG. 6 is a circuit diagram for describing a method for estimating the first and second correction gains on the first and second current sensors 210 and 220, when the current detection unit 200 is realized in the shunt type, in other words, when the current detection unit 200 includes the first current sensor 210 connected between the second lower switch 140 and the reference node, and the second current sensor 220 connected between the third lower switch 160 and the reference node.

The control unit 300 may estimate the first and second correction gains on the first and second current sensors 210 and 220 so that the deviation between the currents detected by the first and second current sensors 210 and 220 is removed in a state where the identical DC current flows to the first and second current sensors 210 and 220 by applying the identical PWM control signal to the first upper switch 110, the second lower switch 160, and the third lower switch 160, and by turning off the first lower switch 130, the second upper switch 130, and the third upper switch 150.

In detail, when the control unit 300 applies the identical PWM control signal to the first upper switch 110, the second lower switch 140 and the third lower switch 160, the DC current Idc flows through the first node, the first current sensor 210 and the first phase inductor based on the DC-Link voltage. As the DC current Idc is bifurcated into the second phase inductor and the third phase inductor with the same magnitude, the DC current of Idc/2 flows along a current path connected to the second phase inductor, the second lower switch 140 and the first current sensor 210, and the DC current of Idc/2 flows along a current path connected to the third inductor, the third lower switch 160 and the second current sensor 220. Accordingly, since a state is formed in which the identical DC current of Idc/2 flows to the first and second current sensors 210 and 220, the magnitudes of the currents detected by the first and second current sensors 210 and 220 should be identical. Here, when the deviation is present between the currents detected by the first and second current sensors 210 and 220, the control unit 300 may estimate the first and second correction gains on the first and second current sensors 210 and 220 so that the deviation is removed. The method for estimating the first and second correction gains is the same as shown in Equations (1) and (2).

That the control unit 300 applies the identical PWM control signal to the first upper switch 110, the second lower switch 140, and the third switch 160 is to prevent a current from being leaked to a phase that is not controlled and to prevent a rotor of the 3-phase motor MT from vibrating to precisely control formation of the DC current.

On the other hand, when the current detection unit 200 is realized in the shunt type, in consideration of the temperature characteristics of the first and second current sensors 210 and 220, a process in which the control unit 300 calculates offsets of the first and second current sensors 210 and 220 may be preceded before estimation of the first and second correction gains.

On the other hand, after the DC current, which flows to the 3-phase motor MT from the inverter unit 100, reaches the steady state, the control unit 300 may calculate each average of the currents respectively detected by the current sensors, and estimate the respective correction gains on the current sensors so that the calculated deviation of the average current is removed. In other words, after the DC current, which flows to the 3-phase motor MT from the inverter unit 100, reaches the steady state, the control unit 300 may calculate the average current (first average current) of the current detected by the first current sensor 210, and calculate the average current (second average current) of the current detected by the second current sensor 220, and then estimate the first and second correction gains so that the deviation between the first average current and the second average current is removed. As an example for calculating the first average current, the control unit 300 may determine whether the DC current reaches the steady state by determining whether n*T (where T is a time constant, and n is a natural number (e.g. 5)) has elapsed from a time point at which the DC current is output. When the DC current is determined to reach the steady state, the control unit 300 may calculate the first average current Isen[avg] according to the following Equation (3).

$$I_{sen}[sum] = i_1 + i_2 \ldots + i_n$$

$$I_{sen}[avg] = I_{sen}[sum]/n$$

The second average current may also be calculated in the same manner as Equation (3).

Reliability of a current detection result may be raised through a scheme in which the average values of the currents detected by the first and second current sensors 210 and 220 are used, and accordingly, the first and second correction gains may be estimated more accurately.

Figure 7A:
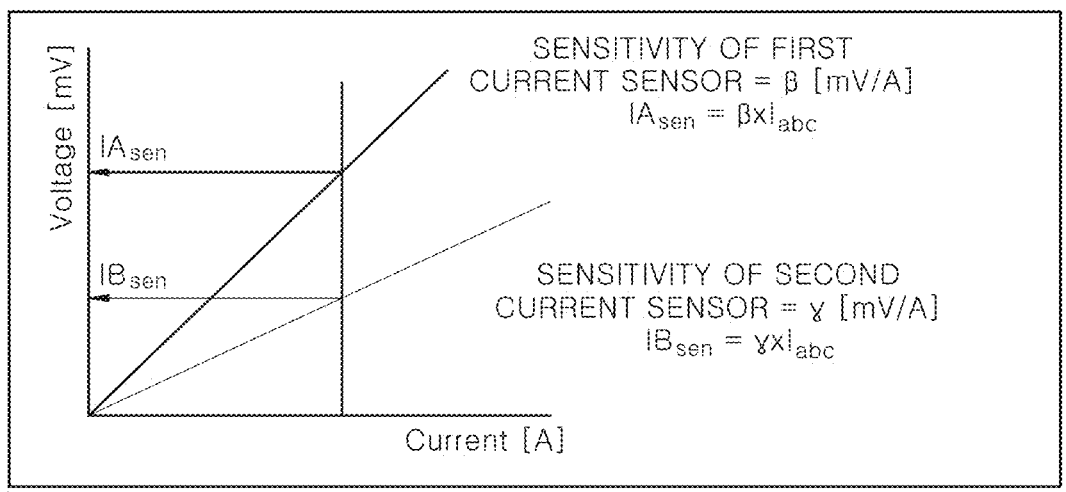
FIGS. 7A and 7B are graphs for showing a result in which the current detection deviation between the current sensors is removed in the motor control apparatus in accordance with an embodiment of the present invention.

FIG. 7 is a graph showing a result in which the current detection deviation between the first and second current sensors 210 and 220 is removed. With reference to FIG. 7A, before the first and second correction gains are applied, even when the identical current is detected, output values (i.e. output voltages) are different due to the sensitivity difference between the first and second current sensors 210 and 220. In other words, for the first current sensor 210 before applying the first correction gain thereto, as the sensitivity appears as β, the detection current becomes $IA_{sen}=\beta*I_{abc}$. For the second current sensor 220 before applying the first correction gain thereto, as the sensitivity appears as γ, the detection current becomes $IB_{sen}=\gamma*I_{abc}$. Accordingly, even when the identical current flows, the detection currents are different.

Figure 7B:
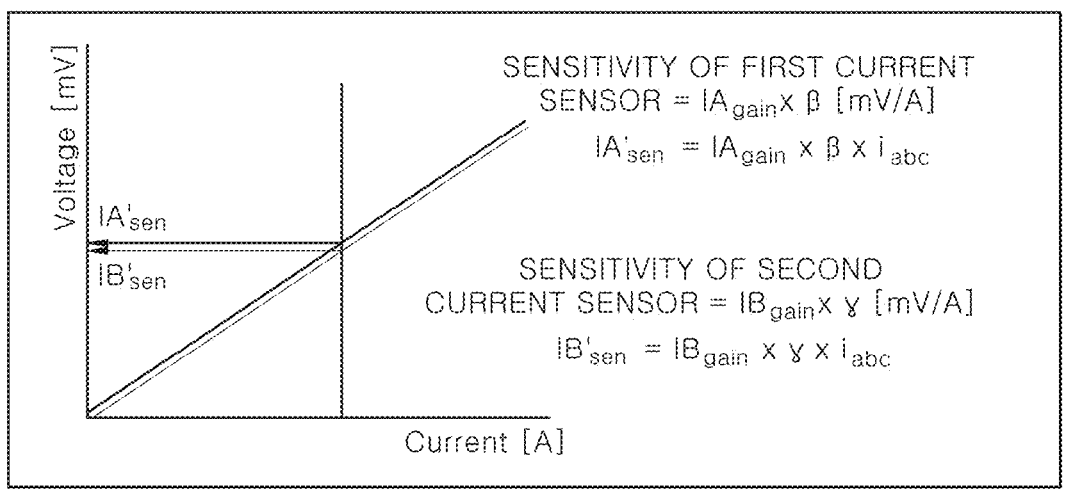

With reference to FIG. 7B, after the first and second correction gains are applied, when the identical current is detected, the sensitivity of the first current sensor 210 after the application of the first correction gain becomes $IA_{gain}*\beta$, and the sensitivity of the second current sensor 220 after the application of the second correction gain becomes $IB_{gain}*\gamma$. Since values of $IA_{gain}*\beta$ and $IB_{gain}*\gamma$ are identical, the sensitivities of the first and second current sensors 210 and 220 are identically compensated. Therefore, when the identical current flows, the detection currents become identical (i.e. $IA'_{sen}=IB'_{sen}$).

Figure 8A:
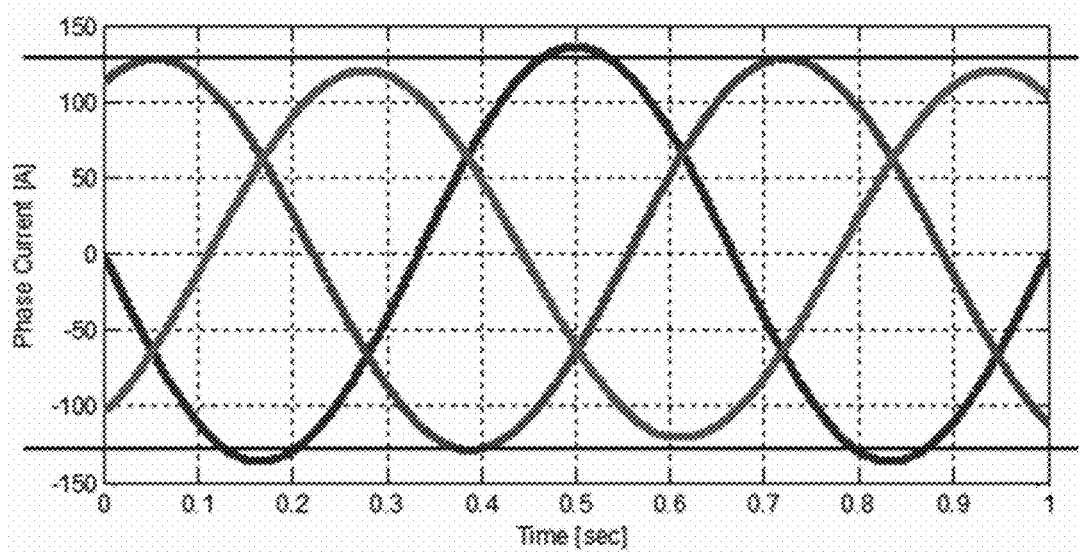
FIG. 8A illustrates a state of a phase current unbalance.
Figure 8B:
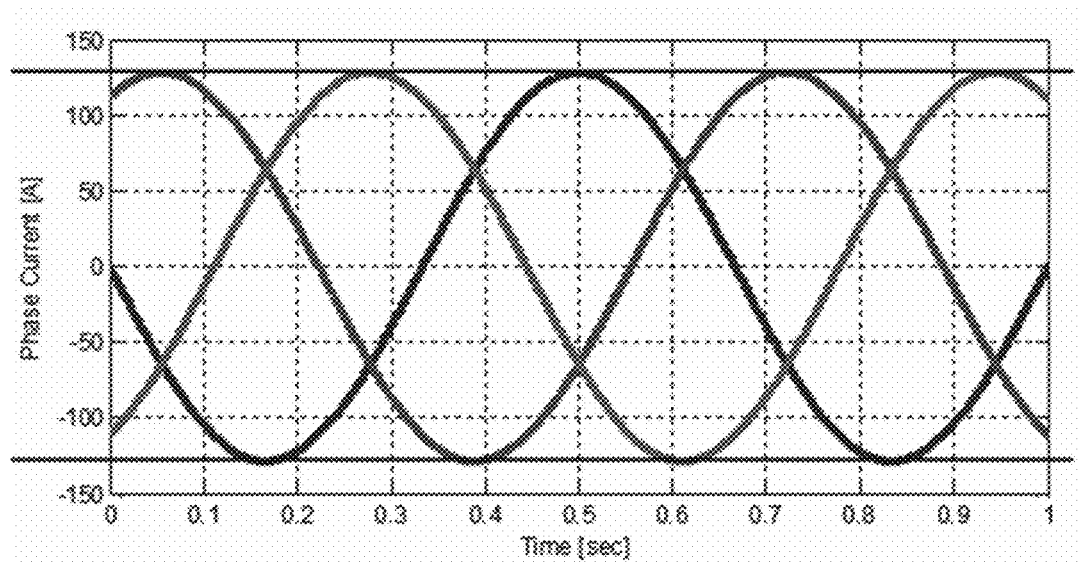
FIG. 8B illustrates a state in which a phase current unbalance is removed in the motor control apparatus in accordance with an embodiment of the present invention.

FIG. 8 illustrates a state in which the phase current unbalance is removed, and with reference to FIG. 8A, it may be checked that before application of the first and second correction gains, the unbalance between the phase currents occurs. With reference to FIG. 8B, after the application of the first and second correction gains, it may be checked that the unbalance between the phase currents is removed, and accordingly, the torque ripple of the 3-phase motor MT, the steering foreignness of the driver, and the operation noise of the MDPS system may be removed.

Figure 9:
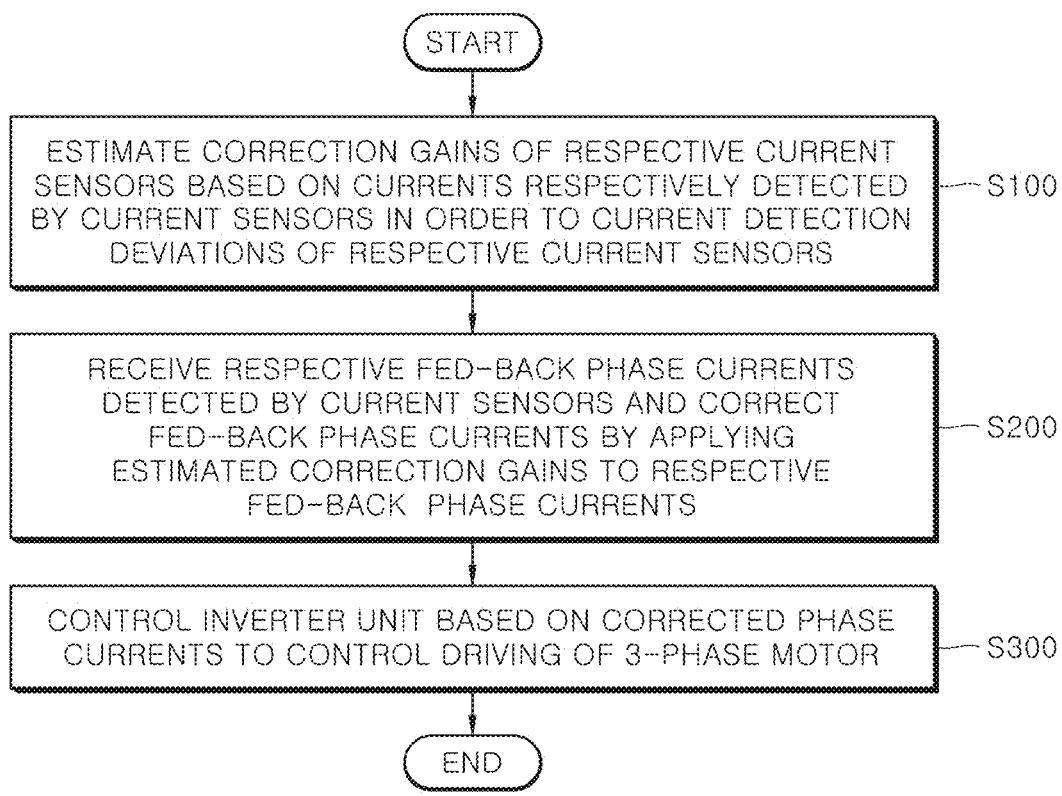
FIG. 9 is a flowchart for describing a method for controlling a motor in accordance with an embodiment of the present invention.

FIG. 9 is a flowchart for describing a motor control method according to an embodiment of the present invention.

With reference to FIG. 9, the motor control method according to an embodiment of the present invention will be described with reference to FIG. 9. First, in order to compensate for the current detection deviation of each of the current sensors, the control unit 300 estimates the respective correction gains of the current sensors based on the currents respectively detected by the current sensors at step S100.

At step S100, as the control unit 300 applies the test control signal to the inverter unit 100, in a state where the DC current is output to the 3-phase motor MT from the inverter unit 100 and the identical DC current flows to each of the current sensors, the correction gains are respectively estimated on the current sensors so that the deviation between the currents respectively detected by the current sensors is removed. In order for the DC current to be output to the 3-phase motor MT from the inverter unit 100, the control unit 300 may apply, as the test control signal, the identical PWM signal to the first to Kth switches among the first to Nth switches included in the inverter unit 100.

In addition, at step S100, after the DC current, which flows to the 3-phase motor MT from the inverter unit 100, reaches the steady state, the control unit 300 may calculate each average of the currents respectively detected by the current sensors, and estimate the respective correction gains on the current sensors so that the calculated deviation of the average current is removed.

Step S100 may be divided into a case in which the current detection unit 200 is realized in the Hall IC type, and a case in which the current detection unit 200 is realized in the shunt type. When the current detection 200 is realized in the Hall IC type and includes the first current sensor 210 connected the first current sensor 210 connected between the first node of the inverter unit 100 and the first phase of the 3-phase motor MT, and the second current sensor 220 connected between the second node of the inverter unit 100 and the second phase of the 3-phase motor MT, at step S100, the control unit 300 may estimate the first and second correction gains on the respective first and second current sensors 210 and 220 so that the deviation between the currents detected by the first and second current sensors 210 and 220 is removed in a state where the identical DC current flows to the first and second current sensors 210 and 220 by applying the identical PWM control signal to the first upper switch 110 and the second lower switch 140, and by turning off the first lower switch 130, the second upper switch 130, the third upper switch 150 and the third lower switch 160.

In addition, when the current detection unit 200 is realized in the shunt type and includes a first current sensor 210 connected between connected between the second lower switch 140 and the reference node, and the second current sensor 220 connected between the third lower switch 160 and the reference node, at step S100, the control unit 300 may estimate the first and second correction gains on the first and second current sensors 210 and 220 so that the deviation between the currents detected by the first and second current sensors 210 and 220 is removed in a state where the identical DC current flows to the first and second current sensors 210 and 220 by applying the identical PWM control signal to the first upper switch 110, the second lower switch 140, and the third lower switch 160, and by turning off the first lower switch 130, the second upper switch 130, and the third upper switch 150.

When the respective correction gains are estimated on the current sensors through step S100, the control unit 300 receives the respective fed-back phase currents detected by the current sensors, and corrects the fed-back phase currents by applying the correction gains estimated at step S100 to the fed-back phase currents at step S200.

In addition, the control unit 300 controls the inverter unit 100 based on each phase current corrected at step S200 to control the driving of the 3-phase motor MT at step S300.

In this way, at the time of a feedback control of the MDPS system, the present embodiment may remove the unbalance of 3-phase currents flowing through the MDPS motor and accordingly remove the torque ripple, the steering foreignness, and the operation noise of the MDPS system to improve NVH performance by applying the pre-estimated correction gain to the phase currents respectively detected by the current sensors so as to remove the current detection deviation of the current sensors, and then controlling the inverter through the PI control.

In accordance with the present embodiments, at time of a feedback control of the MDPS system, the present invention may remove an unbalance of 3-phase currents flowing through a motor driving power steering (MDPS) motor and accordingly remove a torque ripple, steering foreignness of a driver, and an operation noise of the MDPS system to improve noise, vibration and harshness (NVH) performance by applying a pre-estimated correction gain to a phase current detected by each current sensor so as to remove the current detection deviation of each current sensor, and then controlling an inverter through a proportional integral (PI) control.

It should be understood that since the configurations of the embodiments and drawings described herein are merely exemplary embodiments of the present invention, but do not include all the technical spirits of the present invention, there may be provided various equivalents and modifications which may be substituted for the above configurations. Therefore, the technical scope of the present invention should be defined by the accompanying claims.

What is claimed is:

1. An apparatus for controlling a motor comprising:
an inverter unit configured to output 3-phase AC currents through a plurality of switches, the plurality of switches comprising a first upper switch and a first lower switch serially connected at a first node to which a first phase AC current is output, a second upper switch and a second lower switch serially connected at a second node to which a second phase AC current is output, and a third upper switch and a third lower switch serially connected at a third node to which a third phase AC current is output;
a current detection unit comprising a plurality of current sensors configured to detect two or more phase currents from among the 3-phase AC currents flowing through the 3-phase motor, the plurality of current sensors comprising a first current sensor connected between the first node and a first phase of the 3-phase motor, and a second current sensor connected between the second node and a second phase of the 3-phase motor; and
a control unit configured to control driving of the 3-phase motor by the control unit being configured to
receive respective fed-back phase currents detected by the plurality of respective current sensors,
estimates first and second correction gains on the respective first and second current sensors by applying an identical Pulse Width Modulation (PWM) control signal to the first upper switch and the second lower switch and by turning off the first lower switch, the second upper switch, the third upper switch and the third lower switch,
correct the phase currents by applying, to the fed-back phase currents, the first and second correction gains, and
control the inverter unit based on the corrected phase currents.

2. The apparatus of claim 1, wherein the control unit is further configured to estimate the respective correction gains on the plurality of respective current sensors so that the deviation between respective currents detected by the plurality of respective current sensors is removed in a state where a DC current is output to the 3-phase motor from the inverter unit and the DC current flows identically to the plurality of current sensors.

3. The apparatus of claim 2, wherein the control unit is further configured to apply, as a test control signal, an identical PWM control signal to first to Kth (where K is a natural number equal to or smaller than N) switches among first to Nth (where N is a natural number) switches provided in the inverter unit and causes the DC current to be output to the 3-phase motor.

4. The apparatus of claim 2, wherein, in response to the DC current, which flows to the 3-phase motor MT from the inverter unit, reaching a steady state, the control unit is further configured to calculate each average of the currents respectively detected by the plurality of current sensors, and estimates the respective correction gains on the plurality of current sensors so that the calculated deviations of the respective average currents are removed.

5. The apparatus of claim 1, wherein the first and second correction gains removes the deviation between the currents respectively detected by the first and second current sensors in a state where the identical DC current flows to the first and second current sensors.

6. The apparatus of claim 1, wherein the control unit is further configured to estimates first and second correction gains for the respective first and second current sensors so that the deviation between the currents respectively detected by the first and second current sensors is removed in a state where the identical DC current flows to the first and second current sensors by applying an identical PWM control signal to the first upper switch, the second lower switch, and the third lower switch, and by turning off the first lower switch, the second upper switch, the third upper switch.

7. A method for controlling a motor using a motor control apparatus, which comprises an inverter unit configured to output 3-phase AC currents through a plurality of switches to be switched by an input control signal to drive a 3-phase motor, and a current detection unit comprising a plurality of current sensors configured to detect two or more phase currents among the 3-phase AC currents flowing through the 3-phase motor, a control unit configured to control driving of the 3-phase motor, the method comprising:
estimating, by the control unit, respective correction gains of the plurality of current sensors based on respective currents detected by the plurality of current sensors to compensate for a current detection deviation of each of the plurality of current sensors;
receiving, by the control unit, respective fed-back phase currents detected by the plurality of current sensors, and correcting the phase currents by applying the estimated correction gains to the respective fed-back phase currents; and
controlling, by the control unit, the inverter unit based on the corrected phase currents to control driving of the 3-phase motor,
wherein at a time of driving the 3-phase motor, the inverter unit comprises a first upper switch and a first lower switch serially connected at a first node to which a first phase AC current is output, a second upper switch and a second lower switch serially connected at a second node to which a second phase AC current is output, and a third upper switch and a third lower switch serially connected at a third node to which a third phase AC current is output,
wherein the current detection unit comprises a first current sensor connected between the first node and a first phase of the 3-phase motor, and a second current sensor connected between the second node and a second phase of the 3-phase motor, and
wherein the estimating comprises estimating first and second correction gains for the respective first and second current sensors so that the deviation between the currents respectively detected by the first and second current sensors is removed in a state where the identical DC current flows to the first and second current sensors by applying an identical PWM control signal to the first upper switch and the second lower switch, and by turning off the first lower switch, the second upper switch, the third upper switch and the third lower switch.

8. The method of claim 7, wherein the estimating comprises estimating the respective correction gains on the plurality of respective current sensors so that a deviation between respective currents detected by the plurality of respective current sensors is removed, in a state where as a test control signal is applied to the inverter unit, a DC current is output to the 3-phase motor from the inverter unit and the DC current flows identically to the plurality of current sensors.

9. The method of claim 8, wherein the estimating comprises applying, as the test control signal, an identical PWM control signal to first to Kth (where K is a natural number equal to or smaller than N) switches among first to Nth (where N is a natural number) switches provided in the inverter unit and causes the DC current to be output to the 3-phase motor.

10. The method of claim 8, wherein the estimating comprises estimating, in response to the DC current, which flows to the 3-phase motor MT from the inverter unit, reaching a steady state, calculating each average of the currents respectively detected by the plurality of current sensors, and estimates the respective correction gains for the plurality of current sensors so that the respective deviations of the calculated average currents are removed.

11. The method of claim 8, wherein the current detection unit comprises a first sensor connected between the second lower switch and a reference node, and a second current sensor connected between the third lower switch and the reference node.

12. The method of claim 11, wherein the estimating comprises estimating first and second correction gains for the respective first and second current sensors so that the deviation between the currents respectively detected by the first and second current sensors is removed in a state where the identical DC current flows to the first and second current sensors by applying an identical PWM control signal to the first upper switch, the second lower switch, and the third lower switch, and by turning off the first lower switch, the second upper switch, the third upper switch.

* * * * *